United States Patent
Johnson et al.

(10) Patent No.: US 10,060,628 B2
(45) Date of Patent: Aug. 28, 2018

(54) SYSTEMS AND METHODS FOR CREATING A SEAL ABOUT A LIQUID FUEL INJECTOR IN A GAS TURBINE ENGINE

(71) Applicant: General Electric Company, Schenectady, NY (US)

(72) Inventors: Thomas Edward Johnson, Greer, SC (US); Kaitlin Marie Graham, Greenville, SC (US)

(73) Assignee: General Electric Company, Schenectady, NY (US)

(*) Notice: Subject to any disclaimer, the term of this patent is extended or adjusted under 35 U.S.C. 154(b) by 657 days.

(21) Appl. No.: 14/669,131

(22) Filed: Mar. 26, 2015

(65) Prior Publication Data

US 2016/0281989 A1   Sep. 29, 2016

(51) Int. Cl.
| F23R 3/28 | (2006.01) |
| F23R 3/36 | (2006.01) |
| F23D 11/38 | (2006.01) |
| F02C 3/04 | (2006.01) |

(52) U.S. Cl.
CPC ............ F23R 3/283 (2013.01); F02C 3/04 (2013.01); F23D 11/383 (2013.01); F23R 3/286 (2013.01); F23R 3/36 (2013.01); F23R 2900/00012 (2013.01)

(58) Field of Classification Search
CPC .. F23R 3/283; F23R 3/286; F23R 3/36; F23R 2900/00012; F02C 3/04; F23D 11/383
USPC .......................... 60/726, 734, 740
See application file for complete search history.

(56) References Cited

U.S. PATENT DOCUMENTS

| 3,053,312 | A | | 9/1962 | Villoresi |
| 4,898,329 | A | * | 2/1990 | Davis ............ F23R 3/283 239/13 |
| 2004/0123597 | A1 | | 7/2004 | Kraft et al. |
| 2005/0167530 | A1 | | 8/2005 | Ward et al. |

FOREIGN PATENT DOCUMENTS

| EP | 0 677 704 A1 | 10/1995 |
| WO | 2006/081676 A1 | 8/2006 |
| WO | 2012/021709 A1 | 2/2012 |

OTHER PUBLICATIONS

Extended European Search Report and Opinion for European Patent Application No. 16 161 511.7, dated Aug. 8, 2016.

* cited by examiner

*Primary Examiner* — Thai Ba Trieu
*Assistant Examiner* — Loren Edwards
(74) *Attorney, Agent, or Firm* — Eversheds Sutherland (US) LLP

(57) ABSTRACT

A fuel nozzle assembly for a gas turbine engine is disclosed herein. The fuel nozzle assembly may include a fuel injector including an outer jacket having a first end and a second end with a threaded surface disposed therebetween. The first end of the fuel injector may include a cylindrical sealing surface. The fuel nozzle assembly also may include an annular hub including an aperture having a first end and a second end with a threaded surface disposed therebetween. The aperture may be configured to at least partially house the fuel injector therein and includes a conical seat about the first end. The cylindrical sealing surface may swage inward along the conical seat to form a seal therebetween as the liquid fuel injector is threaded into the aperture.

16 Claims, 7 Drawing Sheets

SYSTEMS AND METHODS FOR CREATING A SEAL ABOUT A LIQUID FUEL INJECTOR IN A GAS TURBINE ENGINE

FIELD

The present disclosure relates generally to gas turbine engines and more particularly relates to systems and methods for creating a seal about a liquid fuel injector in a gas turbine engine.

BACKGROUND

The operational efficiency and the overall power output of a gas turbine engine generally increases as the temperature of the hot combustion gas stream increases. High combustion gas stream temperatures, however, may produce higher levels of nitrogen oxides (NOx). Such emissions may be subject to both federal and state regulations in the U.S. and also may be subject to similar regulations abroad. A balancing act thus exists between the benefits of operating the gas turbine engine in an efficient high temperature range while also ensuring that the output of nitrogen oxides and other types of regulated emissions remain well below mandated levels. Moreover, varying load levels, varying ambient conditions, and other types of operational parameters also may have a significant impact on overall gas turbine efficiency and emissions.

Several types of known gas turbine engine designs, such as those using Dry Low NOx ("DLN") combustors, generally premix the flow of fuel and the flow of air upstream of a reaction or a combustion zone so as to reduce NOx emissions via a number of premixing fuel nozzles. Such premixing tends to reduce peak flame temperatures and, hence, NOx emissions.

For fuel flexibility and power system availability, low emissions gas turbines are often equipped with a system to inject a liquid fuel as a secondary or a backup fuel in addition to the gas premixers. The liquid fuel injectors may be inserted through the center of the gas premixers. The liquid fuel injectors must be sealed within the gas premixers to ensure proper performance. Typically, standard seals are used. However, restrictive space limitations may result in limiting the space for additional liquid fuel injectors. Additionally, current seals have areas that may potentially trap fuel during flushing, requiring a longer water flushing cycle. Current sealing techniques also include two sealing surfaces that can leak. More so, it can be easy to forget to install the separate seals. Other design options attempt to install injectors permanently via a brazing or welding operation, which can complicate maintenance of the liquid fuel injectors due to the inability to remove them.

BRIEF DESCRIPTION

Some or all of the above needs and/or problems may be addressed by certain embodiments of the present disclosure. According to an embodiment, there is disclosed a fuel nozzle assembly for a gas turbine engine. The fuel nozzle assembly may include a fuel injector including an outer jacket having a first end and a second end with a threaded surface disposed therebetween. The first end of the fuel injector may include a cylindrical sealing surface. The fuel nozzle assembly also may include an annular hub including an aperture having a first end and a second end with a threaded surface disposed therebetween. The aperture may be configured to at least partially house the fuel injector therein and includes a conical seat about the first end. The cylindrical sealing surface may swage inward along the conical seat to form a seal therebetween as the liquid fuel injector is threaded into the aperture.

In another embodiment, a fuel nozzle assembly for a gas turbine engine is disclosed. The fuel nozzle may include a liquid fuel injector comprising an outer jacket having a first end and a second end with a threaded surface disposed therebetween. The first end of the liquid fuel injector may include a cylindrical sealing surface. The fuel nozzle also may include an annular hub including an aperture having a first end and a second end with a threaded surface disposed therebetween. The aperture may be configured to at least partially house the liquid fuel injector therein and include a conical seat about the first end that is configured to mate with the cylindrical sealing surface of the liquid fuel injector as the liquid fuel injector is threaded into the aperture.

According to another embodiment, a gas turbine engine is disclosed. The gas turbine engine may include a compressor, a combustor in communication with the compressor, and a turbine in communication with the combustor. The combustor may include a fuel nozzle assembly having a fuel injector including an outer jacket having a first end and a second end with a threaded surface disposed therebetween. The first end of the fuel injector may include a cylindrical sealing surface. The fuel nozzle assembly also may include an annular hub including an aperture having a first end and a second end with a threaded surface disposed therebetween. The aperture may be configured to at least partially house the fuel injector therein and includes a conical seat about the first end. The cylindrical sealing surface may swage inward along the conical seat to form a seal therebetween as the liquid fuel injector is threaded into the aperture.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Illustrative embodiments will now be described more fully hereinafter with reference to the accompanying drawings, in which some, but not all embodiments are shown. The present disclosure may be embodied in many different forms and should not be construed as limited to the embodiments set forth herein. Like numbers refer to like elements throughout.

Figure 1:
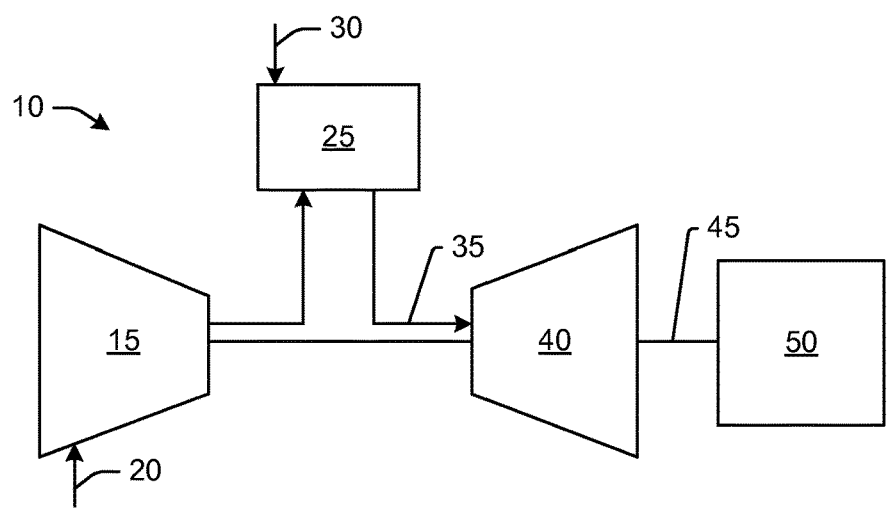
FIG. 1 schematically depicts an example gas turbine engine according to an embodiment.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
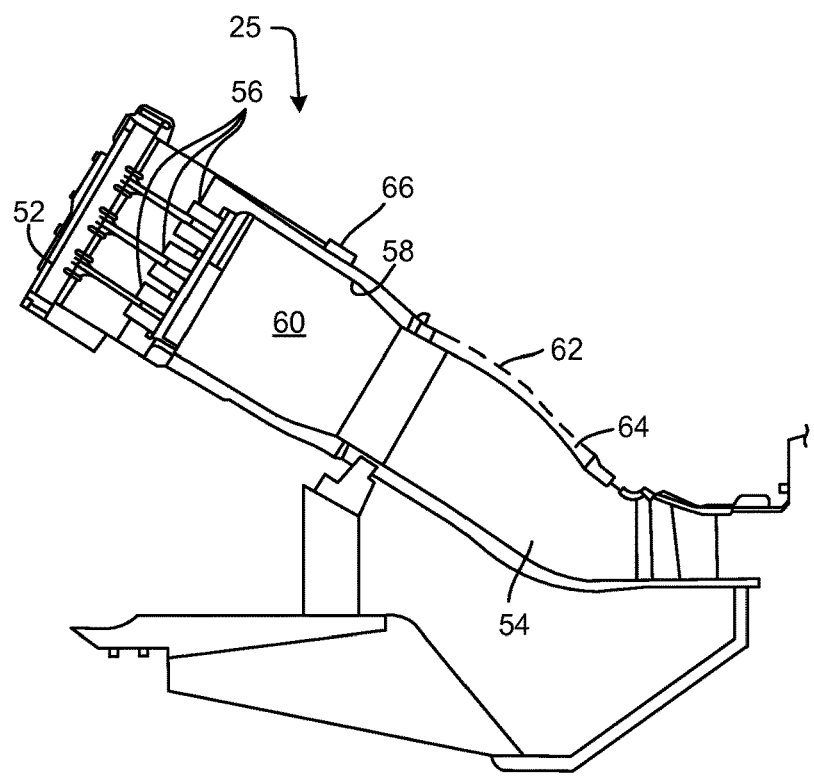
FIG. 2 schematically depicts an example combustor according to an embodiment.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. An outer casing 66 may surround the flow sleeve 62 in part. Any number of the combustors 25 may be used herein in a circumferential array and the like. As described above, the flow of air 20 and the flow of fuel 30 may be ignited in the combustor 25 to create the flow of combustion gases 35. The combustor 25 described herein is for the purpose of example only. Combustors with other types of components and other configurations also may be used herein.

Figure 3:
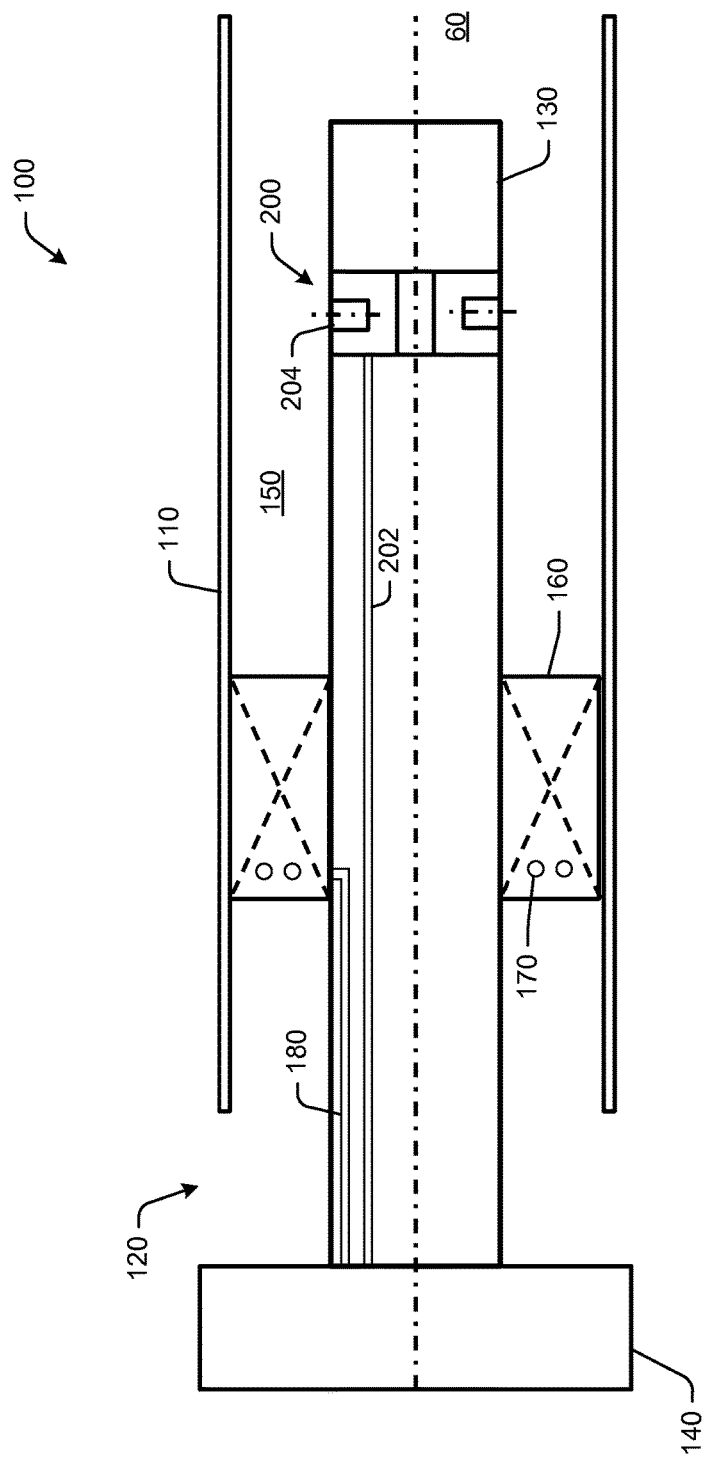
FIG. 3 schematically depicts an example premixing fuel nozzle according to an embodiment.

FIG. 3 show an example of a premixing fuel nozzle 100 as may be described herein. The premixing fuel nozzle 100 may be used with the combustor 25 and the like. The combustor 25 may use any number of the premixing fuel nozzles 100 in any configuration.

Generally described, the premixing fuel nozzle 100 may include an outer annular shroud 110. The outer annular shroud 110 may extend from an air inlet 120 on an upstream end thereof and may end about the combustion zone 60 at a downstream end thereof. The outer annular shroud 110 may surround an inner annular wall or a hub 130. The hub 130 may extend from a gas fuel nozzle flange 140 at the upstream end thereof and may end upstream of the end of the outer annular shroud 110. The outer annular shroud 110 and the hub 130 may define a premixing chamber 150 therebetween. The premixing chamber 150 may be in communication with a flow of air 20 from the compressor 15 or elsewhere. A number of swirler vanes 160 also may extend from the hub 130 to or about the outer annular shroud 110. The swirler vanes 160 may have any suitable size, shape, or configuration. A number of fuel injection ports 170 may be positioned about the swirler vanes 160. The fuel injection ports 170 may be in communication with a flow of fuel 30. The swirler vanes 160 with the injection ports 170 thus provide fuel/air mixing and premixed flame stabilization. In this example, the flow fuel 30 may be a flow of natural gas. Other types of fuels may be used herein. The flow of air 20 and the flow of fuel 30 may begin to mix within the premixing chamber 150 and swirler vanes 160 and flow into the combustion zone 60. Other components and other configurations may be used herein.

The premixing fuel nozzle 100 also may include a number of concentric tubes defining discrete annular passages for the flow of different types of fluids. The concentric tubes may have any suitable size, shape, or configuration. A gas passage 180 for a flow of a primary fuel such as natural gas may extend from the gas fuel nozzle flange 140 to the fuel injection ports 170 about the swirler vanes 160.

In use, the premixing fuel nozzle 100 mixes a flow of the fuel 30 such as natural gas via the gas passage 180 and the fuel injection ports 170 of the swirler vanes 160 with a flow of air 20 from the compressor 15 or otherwise via the air inlet 120. The flows may be swirled downstream of the swirler vanes 160 and mixed within the premixing chamber 150 before ignition within the combustion zone 60.

The premixing fuel nozzle 100 also may include a liquid fuel system 200. The liquid fuel system 200 may provide a flow of a secondary fuel such as a distillate, biodiesel, ethanol, and the like. The liquid fuel system 200 may include a liquid fuel passage 202. The liquid fuel passage 202 may extend from the gas fuel nozzle flange 140 to a number of liquid fuel injectors 204. The liquid fuel injectors 204 may be aligned in a single plane as is shown and/or the injectors 204 may be in a staggered configuration. Any number of liquid fuel injectors 204 may be used. In some instances, the liquid fuel injectors 204 may be atomizing liquid fuel injectors, plain jet injectors, and/or simple orifice injectors. Other types of fuel injectors may be used herein. Any type or combination of liquid fuel injectors may be used herein.

Figure 4:
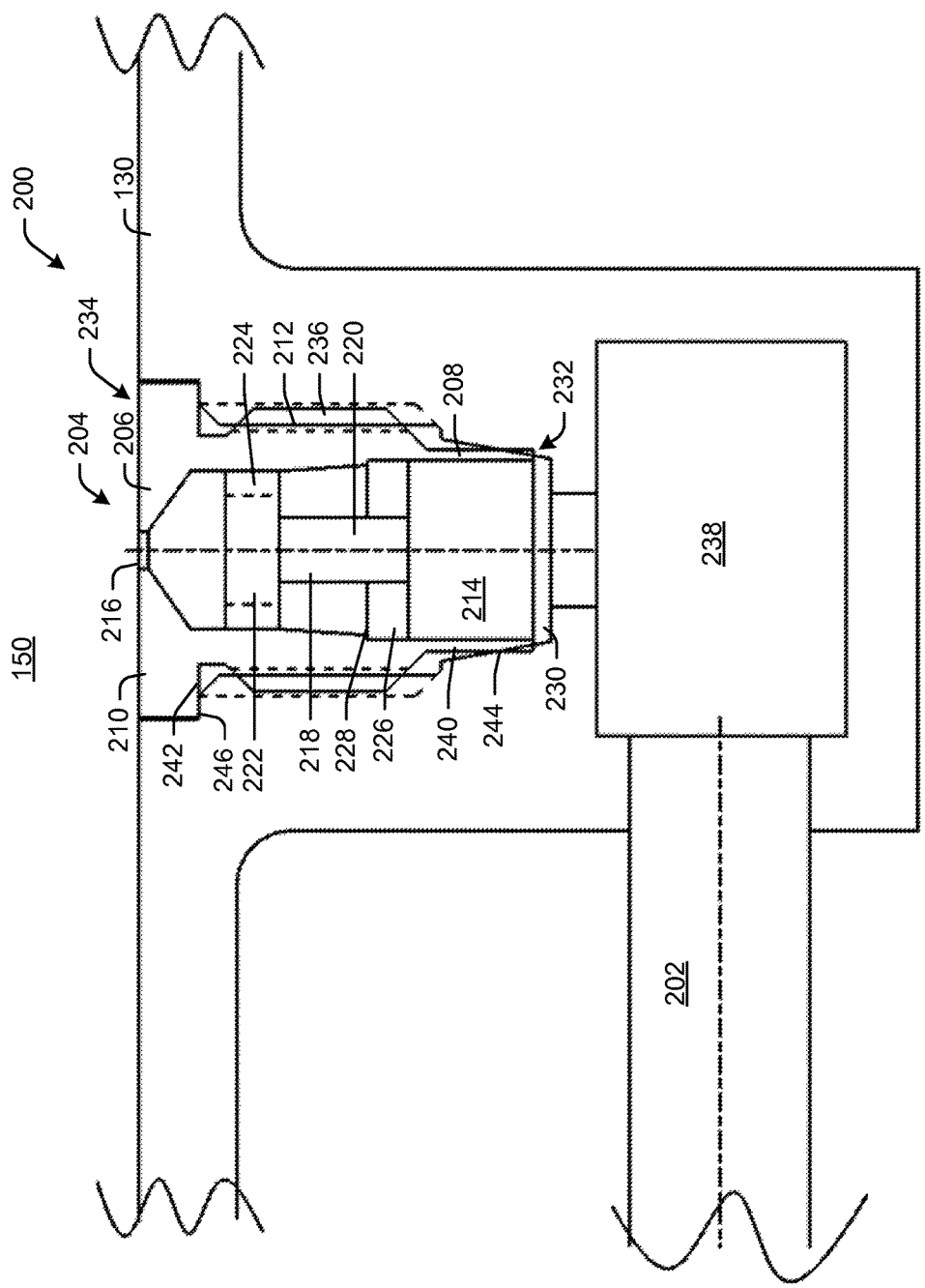
FIG. 4 schematically depicts an example liquid fuel system according to an embodiment.
Figure 5:
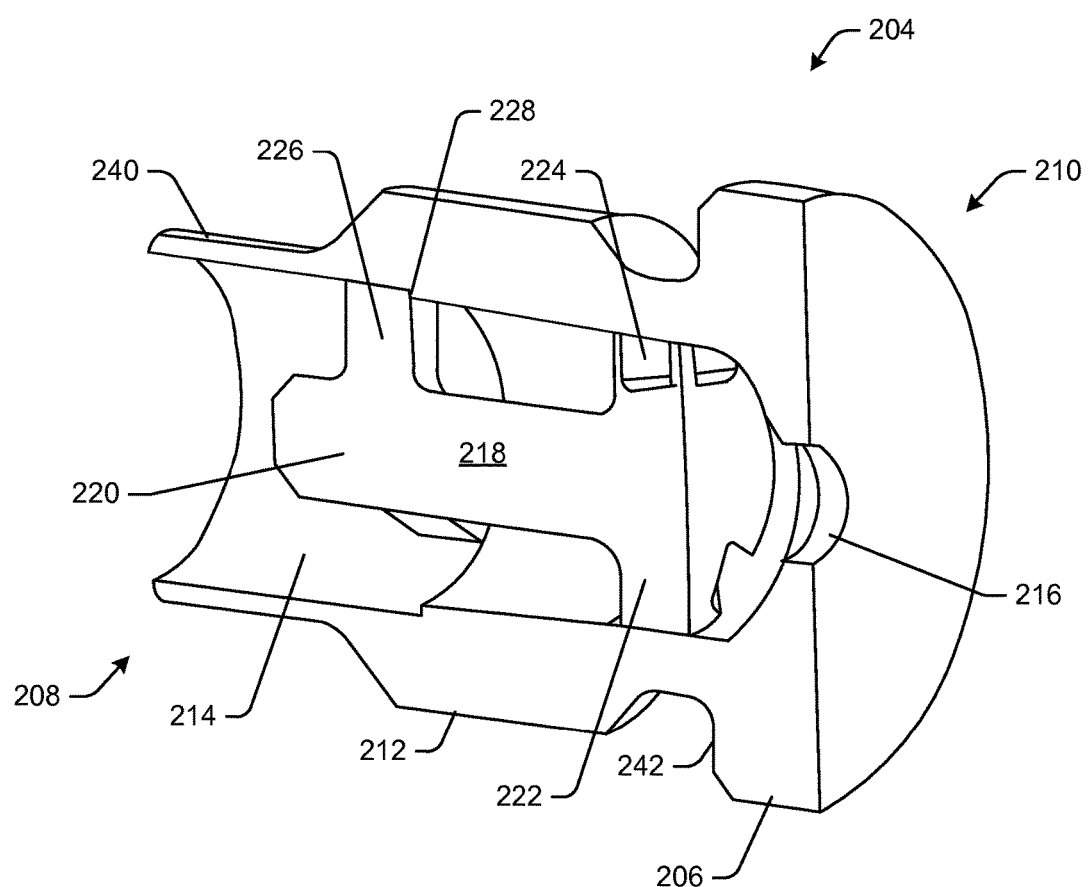
FIG. 5 schematically depicts an example liquid fuel injector according to an embodiment.
Figure 6:
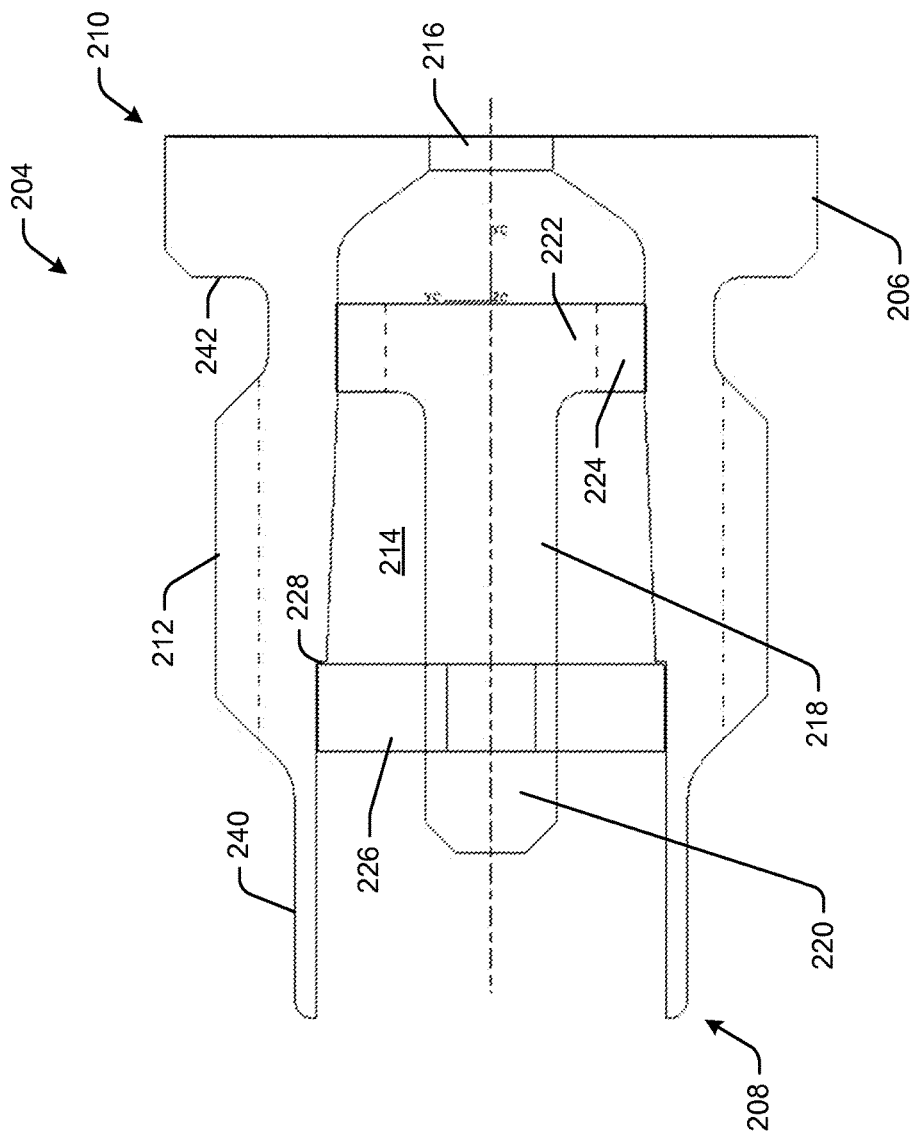
FIG. 6 schematically depicts an example liquid fuel injector according to an embodiment.

As depicted in FIGS. 4-6, the liquid fuel injectors 204 may be atomizing liquid fuel injectors. For example, each of the liquid fuel injectors 204 may include an outer jacket 206 having a first end 208 and a second end 210 with a threaded surface 212 disposed therebetween. The outer jacket 206 may include an internal passageway 214 between the first end 208 and the second end 210. The internal passageway 214 may be in communication with an orifice 216 disposed about the second end 210. In some instances, the orifice 216 may be narrower than the internal passage 214.

A swirler 218 may be disposed within the internal passage 214. The swirler 218 may include a lower stem 220 leading to an upper flange 222. The upper flange 222 may include a number of slots 224 positioned therein. In some instances, the slots 224 may be angled. Any number of slots 224 may be used. In addition, a number of struts 226 may extend from the lower flange 220 to the surface of the internal passageway 214. In some instances, a lip 228 formed within the internal passageway 214 may be configured to abut or mate with the struts 226. Any type of swirler may be used herein.

The hub 130 may include an aperture 230 having a first end 232 and a second end 234 with a threaded surface 236 disposed therebetween. The aperture 230 may be configured to at least partially house the liquid fuel injector 204 therein. The aperture 230 may be in communication with the liquid fuel passage 202. In some instances, the liquid fuel passage 202 may include a fuel plenum 238.

The flow of a liquid fuel thus may flow through the liquid fuel passages 202. The liquid fuel may be accelerated as it flows through the slots 224 of the upper flange 222 of the inner swirler 218. The flow then again may be accelerated as it passes through the narrow orifice 216 and atomized as it enters the premixing chamber 150 for mixing with the flow of air 20 therein. In some instances, the liquid fuel injectors 204 may be mounted about the hub 130 downstream of the swirler vanes 160 so as to avoid impairing the aerodynamics of the overall premixing fuel nozzle 100 or impairing the operability and/or emission compliance when operating on a gas fuel by distorting the gas fuel/air mixture profile.

To ensure an adequate seal is formed between the liquid fuel injector 204 and the hub 130, the first end 208 of the liquid fuel injector 204 may include a cylindrical sealing surface 240, and the second end 210 of the liquid fuel injector 204 may include a seating surface 242. The aperture 230 may include a conical seat 244 about the first end 232 that is configured to mate with the cylindrical sealing surface 240 of the liquid fuel injector 204 as the liquid fuel injector 204 is threaded into the aperture 230. In this manner, the cylindrical sealing surface 240 swages inward along the conical seat 244 to form a seal therebetween as the liquid fuel injector 204 is threaded into the aperture 230. The length, thickness, and/or angle of the cylindrical sealing surface 240 and/or the conical seat 244 may vary. The second end of the aperture 230 may include a seating surface 246 configured to mate with the seating surface 242 of the liquid fuel injector 204 as the liquid fuel injector 204 is threaded into the aperture 230. The seating surface 242 may set and/or limit the amount of engagement between the cylindrical sealing surface 240 and conical seat 244. The term swage means, among other things, forcing a component into a confined space so as to reduce the diameter of the component and create a seal therebetween.

The cylindrical sealing surface 240 and the corresponding conical seat 244 ensure an adequate seal between the liquid fuel injector 204 and the hub 130 without the installation of a separate sealing component. The sealing arrangement ensures that the fuel flows through the orifice 216 and not around the liquid fuel injector 204. The present arrangement eliminates the need for many hundreds of additional costly seals and allows a tighter packing of liquid fuel injectors 204 within the hub 130, resulting in lower emissions and better thermal protection. In addition, the sealing interface between the liquid fuel injector 204 and the hub 130 provides a much cleaner flow path for the liquid fuel. The flow path may be flushed clean after the circuit is turned off. The present arrangement also provides a "thermal break" between the liquid fuel and the hot wall of the injector housing. This helps to eliminate the formation of coke on the wetted walls of the atomizer.

Figure 7:
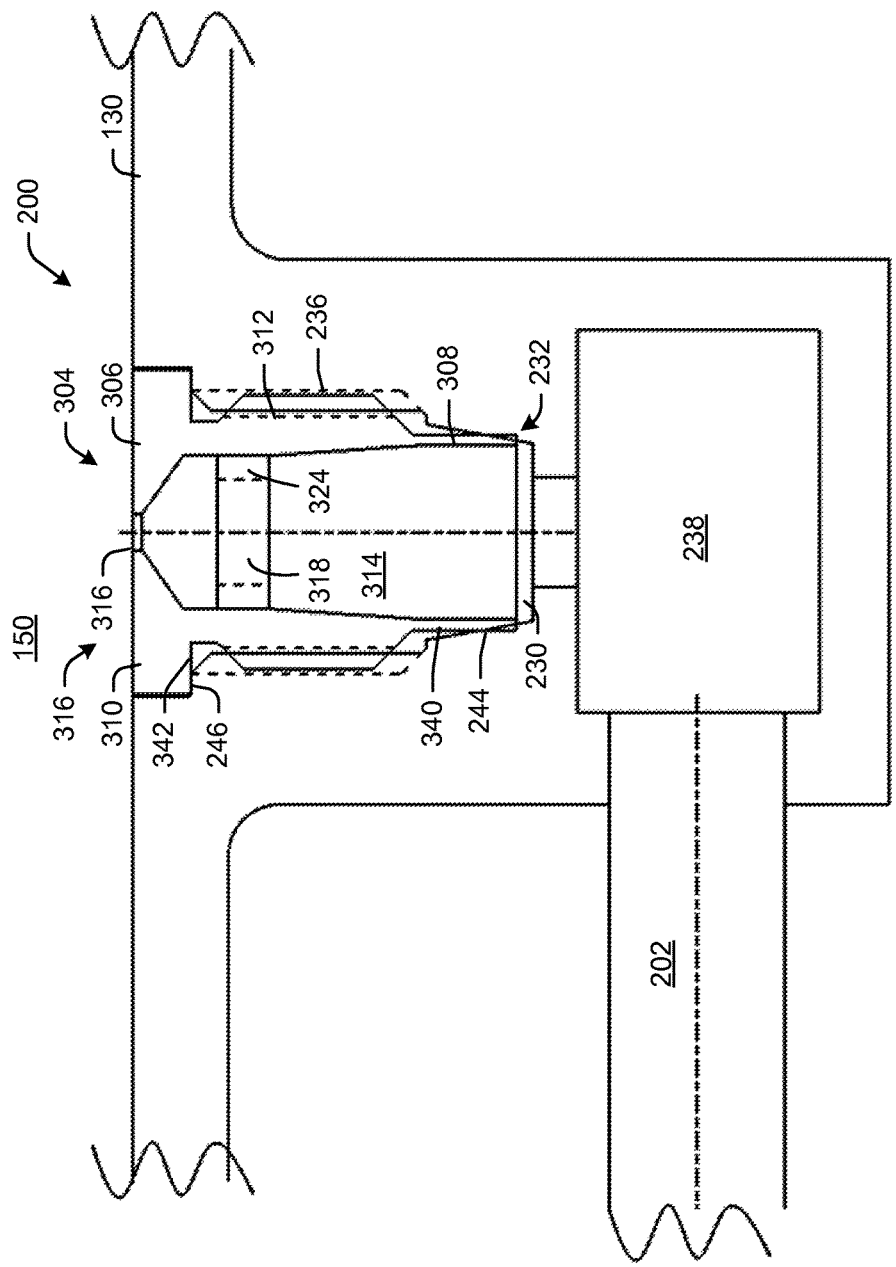
FIG. 7 schematically depicts an example liquid fuel system according to an embodiment.
Figure 8:
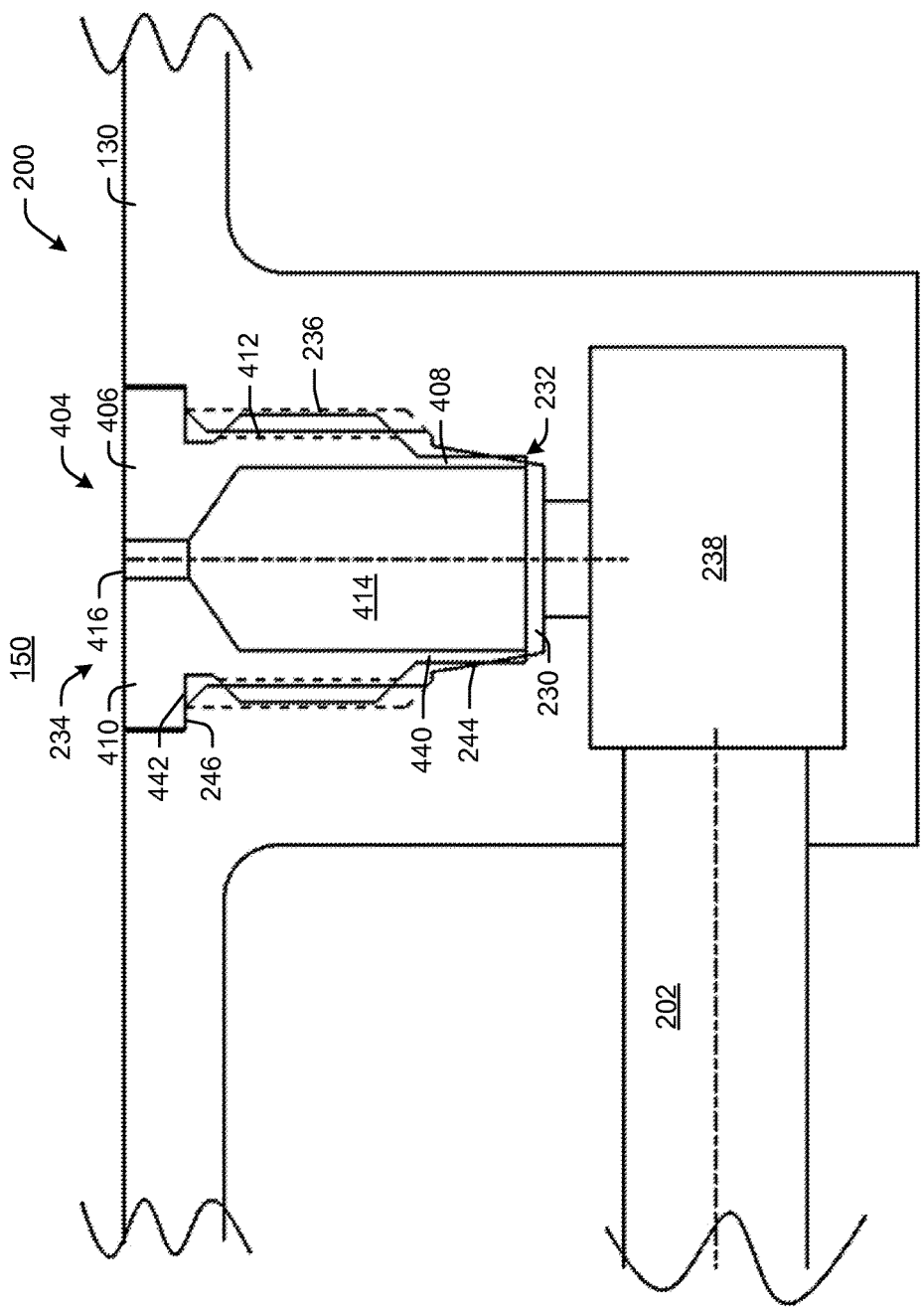
FIG. 8 schematically depicts an example liquid fuel system according to an embodiment.

FIGS. 7 and 8 depict alternate fuel injector embodiments. For example, FIG. 7 depicts a liquid fuel injector 304. The liquid fuel injector 304 may include an outer jacket 306 having a first end 308 and a second end 310 with a threaded surface 312 disposed therebetween. The outer jacket 306 may include an internal passageway 314 between the first end 308 and the second end 310. The internal passageway 314 may be in communication with an orifice 316 disposed about the second end 310. In some instances, the orifice 316 may be narrower than the internal passage 314.

A swirler 318 may be disposed within the internal passage 314. The swirler 318 may include a number of slots 324 positioned therein. In some instances, the slots 324 may be angled. Any number of slots 324 may be used. Any type of swirler may be used herein.

To ensure an adequate seal is formed between the liquid fuel injector 304 and the hub 130, the first end 308 of the liquid fuel injector 304 may include a cylindrical sealing surface 340, and the second end 310 of the liquid fuel injector 304 may include a seating surface 342. The aperture 230 may include a conical seat 244 about the first end 232 that is configured to mate with the cylindrical sealing surface 340 of the liquid fuel injector 304 as the liquid fuel injector 304 is threaded into the aperture 230. In this manner, the cylindrical sealing surface 340 swages inward along the conical seat 244 to form a seal therebetween as the liquid fuel injector 304 is threaded into the aperture 230. The length, thickness, and/or angle of the cylindrical sealing surface 340 and/or the conical seat 244 may vary. The seating surface 246 may be configured to mate with the seating surface 342 of the liquid fuel injector 304 as the liquid fuel injector 304 is threaded into the aperture 230. The seating surface 342 may set and/or limit the amount of engagement between the cylindrical sealing surface 340 and conical seat 244.

FIG. 8 depicts a liquid fuel injector 404. The liquid fuel injectors 404 may include an outer jacket 406 having a first end 408 and a second end 410 with a threaded surface 412 disposed therebetween. The outer jacket 406 may include an internal passageway 414 between the first end 408 and the second end 410. The internal passageway 414 may be in communication with an orifice 416 disposed about the second end 410. In some instances, the orifice 416 may be narrower than the internal passage 414.

To ensure an adequate seal is formed between the liquid fuel injector 404 and the hub 130, the first end 408 of the liquid fuel injector 404 may include a cylindrical sealing surface 440, and the second end 410 of the liquid fuel injector 404 may include a seating surface 442. The aperture 230 may include a conical seat 244 about the first end 232 that is configured to mate with the cylindrical sealing surface 440 of the liquid fuel injector 404 as the liquid fuel injector 404 is threaded into the aperture 230. In this manner, the cylindrical sealing surface 440 swages inward along the conical seat 244 to form a seal therebetween as the liquid fuel injector 404 is threaded into the aperture 230. The length, thickness, and/or angle of the cylindrical sealing surface 440 and/or the conical seat 244 may vary. The seating surface 246 may be configured to mate with the seating surface 442 of the liquid fuel injector 404 as the liquid fuel injector 404 is threaded into the aperture 230. The seating surface 442 may set and/or limit the amount of engagement between the cylindrical sealing surface 440 and conical seat 244.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A fuel nozzle assembly for a gas turbine engine, comprising:
    a fuel injector comprising an outer jacket, wherein the outer jacket includes a first end and a second end with a threaded surface disposed therebetween, wherein the first end of the outer jacket comprises a cylindrical sealing surface, wherein the second end of the outer jacket comprises a seating surface; and an annular hub comprising an aperture, wherein the aperture includes a first end and a second end with a threaded surface disposed therebetween, wherein the aperture is configured to at least partially house the outer jacket therein and comprises a conical seat about the first end of the aperture, wherein the cylindrical sealing surface swages inward along the conical seat to form a seal therebetween as the outer jacket is threaded into the aperture, wherein the second end of the aperture comprises a seating surface configured to mate with the seating surface of the outer jacket as the outer jacket is threaded into the aperture.

2. The fuel nozzle assembly of claim 1, wherein the fuel injector comprises an atomizing liquid fuel injector, a plain jet liquid fuel injector, or a simple orifice liquid fuel injector.

3. The fuel nozzle assembly of claim 1, wherein the aperture is in communication with a liquid fuel passage.

4. The fuel nozzle assembly of claim 1, wherein the outer jacket comprises:

an internal passageway between the first end and the second end of the outer jacket; and an orifice disposed about the second end of the outer jacket, wherein the orifice is narrower than the internal passage.

5. A fuel nozzle assembly for a gas turbine engine, comprising:

a liquid fuel injector comprising an outer jacket, wherein the outer jacket includes a first end and a second end with a threaded surface disposed therebetween, wherein the first end of the outer jacket comprises a cylindrical sealing surface, wherein the second end of the outer jacket comprises a seating surface; and an annular hub comprising an aperture, wherein the aperture includes a first end and a second end with a threaded surface disposed therebetween, wherein the aperture is configured to at least partially house the outer jacket therein and comprises a conical seat about the first end of the aperture that is configured to mate with the cylindrical sealing surface of the outer jacket as the outer jacket is threaded into the aperture, wherein the second end of the aperture comprises a seating surface configured to mate with the seating surface of the outer jacket as the outer jacket is threaded into the aperture.

6. The fuel nozzle assembly of claim 5, wherein the aperture is in communication with a liquid fuel passage.

7. The fuel nozzle assembly of claim 6, wherein the liquid fuel passage comprises a fuel plenum therein.

8. The fuel nozzle assembly of claim 5, wherein the outer jacket comprises an internal passageway between the first end and the second end of the outer jacket, wherein the internal passageway is in communication with an orifice disposed about the second end of the outer jacket.

9. The fuel nozzle assembly of claim 8, wherein the orifice is narrower than the internal passage.

10. The fuel nozzle assembly of claim 8, further comprising a swirler disposed within the internal passage.

11. The fuel nozzle assembly of claim 5, wherein the liquid fuel injector comprises an atomizing liquid fuel injector, a plain jet liquid fuel injector, or a simple orifice liquid fuel injector.

12. A gas turbine engine, comprising:

a compressor;

a combustor in communication with the compressor, the combustor including a fuel nozzle assembly, comprising:

an outer annular shroud;

an annular hub disposed within the outer annular shroud;

a premixing chamber defined between the outer annular shroud and the annular hub;

a fuel injector comprising an outer jacket, wherein the outer jacket includes a first end and a second end with a threaded surface disposed therebetween, wherein the first end of the outer jacket comprises a cylindrical sealing surface, wherein the second end of the outer jacket comprises a seating surface; and an aperture in the annular hub, wherein the aperture includes a first end and a second end with a threaded surface disposed therebetween, wherein the aperture is configured to at least partially house the outer jacket therein and comprises a conical seat about the first end of the aperture, wherein the cylindrical sealing surface swages inward along the conical seat to form a seal therebetween as the outer jacket is threaded into the aperture, wherein the second end of the aperture comprises a seating surface configured to mate with the seating surface of the outer jacket as the outer jacket is threaded into the aperture; and a turbine in communication with the combustor.

13. The gas turbine engine of claim 12, wherein the aperture is in communication with a liquid fuel passage.

14. The gas turbine engine of claim 12, wherein the outer jacket comprises an internal passageway between the first end and the second end of the outer jacket, wherein the internal passageway is in communication with an orifice disposed about the second end of the outer jacket.

15. The gas turbine engine of claim 14, wherein the orifice is narrower than the internal passage.

16. The gas turbine engine of claim 12, wherein the liquid fuel injector comprises an atomizing liquid fuel injector, a plain jet liquid fuel injector, or an simple orifice liquid fuel injector.

\* \* \* \* \*